Aug. 29, 1967   N. R. HALLMAN   3,338,599
TRANSPOSITION SECTION FOR LAY-IN DUCT
Filed June 30, 1965
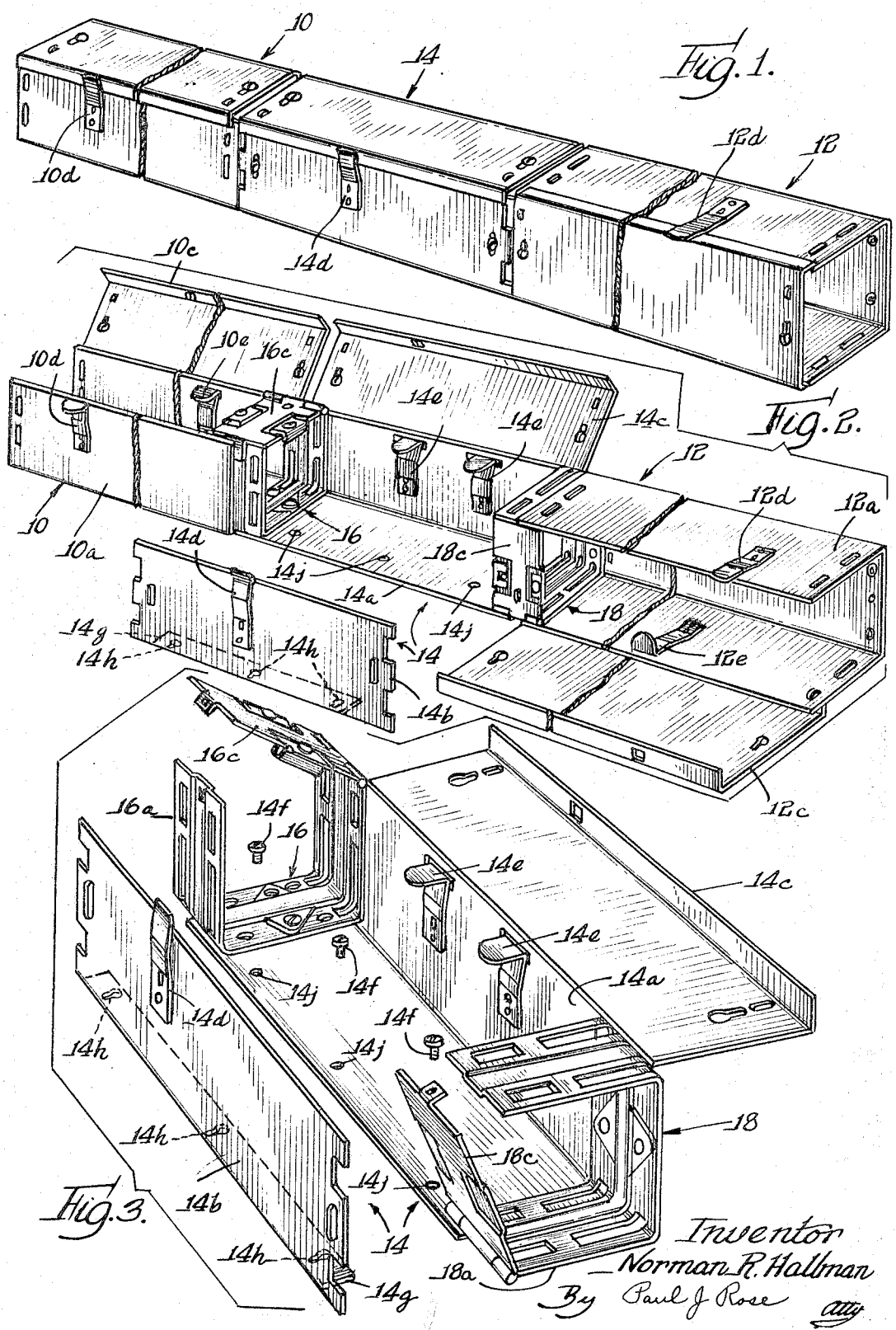

United States Patent Office 3,338,599
Patented Aug. 29, 1967

3,338,599
TRANSPOSITION SECTION FOR LAY-IN DUCT
Norman R. Hallman, Lexington, Ky., assignor to Square D Company, Park Ridge, Ill., a corporation of Michigan
Filed June 30, 1965, Ser. No. 468,441
7 Claims. (Cl. 285—121)

ABSTRACT OF THE DISCLOSURE

A transposition section for connecting two standard sections of electrical lay-in duct extending in the same direction but rotated ninety degrees from each other about their longitudinal axes. A side wall of a channel-shaped body of the transposition section is removable to unblock a cover of a connector between the transposition section and the adjacent standard duct section.

---

This invention relates to duct for electric current carrying wires, and more particularly to wiring duct of the lay-in type, in which the covers of connected duct sections may be opened and wires may be laid transversely into the duct rather than being pulled longitudinally into one end of the duct from the other end thereof.

Lay-in duct is normally made square in cross section, a cover of each manufactured length or section of duct either being completely removable or pivotally mounted on a side wall of a channel-shaped portion or body of the duct section. To standard lengths or sections of lay-in duct may be connected together by a connector which fits inside the joint in overlapping relationship with adjacent end portions of the duct sections and has a channel-shaped body and a cover pivotally connected thereto. Such lay-in duct and connectors are fully described in U.S. Patent No. 2,917,083, issued Dec. 15, 1959.

The present invention relates more specifically to a transposition section for such lay-in duct. In a straight run of lay-in duct, it is sometimes desirable that the channel-shaped duct section bodies in a first part of the duct run have their open sides facing in a first direction and that the channel-shaped duct section bodies in a second part of the duct run have their open sides facing in a second direction perpendicular to the first. It will be understood that when all the duct section bodies in a run of lay-in duct have their open sides facing in the same direction, the connectors between the duct sections may also have the open sides of their bodies facing in the same direction, so that the covers of the duct sections and the covers of the connectors may be opened and no obstruction is presented to the laying of wires into the duct run. However, when the open sides of the duct section bodies respectively in two different parts of the duct run face in directions perpendicular to each other, the particular connector joining the two parts of the duct run will be disposed with part of its cover against a side body of one of the duct sections, so that the cover of the particular connector cannot be opened. Prior to this invention, it was necessary either to fish wires through this particular connector or to keep the open sides of the duct section bodies facing in the same direction for the complete duct run.

An object of the invention is to provide a transposition section for lay-in duct, the transposition section enabling a duct run to be installed with the open sides of the channel-shaped duct section bodies respectively in two different parts of the duct run facing in directions perpendicular to each other, without blocking the covers of any connectors between duct sections.

FIG. 1 is a perspective view of a transposition section for lay-in duct, the transposition section having opposite ends connected respectively to two sections of lay-in duct having their closed covers rotated through ninety degrees with respect to each other.

FIG. 2 is a partially exploded perspective view similar to FIG. 1, the covers of the duct sections being open; and FIG. 3 is a partially exploded perspective view of the transposition section of FIGS. 1 and 2 and the pair of connectors connected respectively to opposite ends thereof, the covers of the transposition section and the connectors being open.

FIGS. 1 and 2 show a pair of duct sections 10 and 12 which are identical in construction and which may be manufactured in various lengths. The duct sections 10 and 12 are connected respectively to opposite ends of a transposition section 14 respectively by a pair of identical connectors 16 and 18.

The duct section 10 is disposed so that a channel-shaped body 10a thereof is open at the top and closable by a flanged cover 10c pivotally mounted on a rear side wall of the body 10a. The duct section 12 may be identical to the duct section 10, but is disposed so that a channel-shaped body 12a thereof is open at the front and closable by a flanged cover 12c pivotally mounted on a lower side wall of the body 12a. It will be understood that the duct section 12 could be reversed end for end so that the cover 12c would be pivotally mounted on an upper side wall of the body 12a, but preferably the duct section 12 is disposed as shown so that the cover 12c will hang in an open position.

The connector 16 is disposed so that a channel-shaped body 16a (FIG. 3) thereof is open at the top and closable by a cover 16c pivotally mounted on a rear side wall of the body 16a. The connector 18 is identical to the connector 16, but is disposed so that a channel-shaped body 18a thereof is open at the front and closable by a cover 18c pivotally mounted on a lower side wall of the body 18a.

The duct sections 10 and 12 and the connectors 16 and 18 may be identical with those disclosed and more fully described in application, Ser. No. 339,246, filed Jan. 21, 1964. Thus, the duct sections 10 and 12 may be provided respectively with one or more latches 10d and 12d for latching the covers 10c and 12c, and respectively with two or more separable hinges 10e and 12e, to enable the covers 10c and 12c to be completely removed if desired.

The transposition section 14 includes a two-part channel-shaped body having a generally L-shaped body portion 14a and a flanged side wall 14b removably secured thereto, and a flanged cover 14c pivotally mounted on a rear side wall of the body portion 14a. A latch 14d, identical to the latches 10d and 12d, is secured to the side wall 14b, and a pair of separable hinges 14e, identical to the hinges 10e and 12e, are provided on the rear side wall of the body portion 14a. A plurality of screws 14f are provided for removably securing a flange 14g of the side wall 14b to a marginal edge portion of the bottom wall of the body portion 14a. The screws 14f respectively extend through a plurality of keyhole-shaped slots 14h provided in the flange 14g and are threaded respectively into a plurality of holes 14j provided in the bottom wall of the body portion 14a.

As can be seen in FIG. 2, when the side wall 14b of the transposition section is removed, the cover 18c of the connector 18 is unobstructed and can be pivoted open as shown in FIG. 3. When the duct section covers 10c and 12c, the transposition section cover 14c, and the connector covers 16c and 18c are open, wires may be laid laterally in place in the duct run. If the side wall 14b were not removable, the cover 18c could not be opened, and the wires would have to be fished longitudinally through the connector 18.

Various modifications may be made in the structure disclosed without departing from the spirit and scope of the invention as set forth in the appended claims, wherein words having directional connotations are purely relative, it being understood that a duct run may be installed to extend selectively in various directions.

I claim:

1. A duct run of lay-in duct for electric current carrying wires, said duct run extending horizontally and including a first duct section having a channel-shaped body disposed with the open side thereof at the top of the duct run and an openable cover normally closing the open side of said body of said first duct section, a second duct section having a channel-shaped body disposed with the open side thereof at a side of the duct run and an openable cover normally closing the open side of said body of said second duct section, a transposition duct section disposed between said first and second duct sections, a first connector connecting an end portion of said first duct section to one end portion of said transposition duct section, said first connector having a channel-shaped body disposed with the open side thereof at the top of the duct run and an openable cover normally closing the open side of said body of said first connector, and a second connector connecting an end portion of said second duct section to the other end portion of said transposition duct section, said second connector having a channel-shaped body disposed with the open side thereof at said side of the duct run and an openable cover normally closing the open side of said body of said second connector, said transposition duct section having a two-part channel-shaped body disposed with the open side thereof at the top of the duct run and an openable cover normally closing the open side of said body of said transposition duct section, and said two-part channel-shaped body including a generally L-shaped body portion and a side wall removably secured to said L-shaped body portion to complete the channel shape of said two-part channel-shaped body of said transposition duct section.

2. A duct run as claimed in claim 1, wherein the covers of said first and second duct sections are pivotally connected respectively to the channel-shaped bodies thereof.

3. A duct run as claimed in claim 1, wherein the covers of said first and second connectors are pivotally connected respectively to the channel-shaped bodies thereof.

4. A duct run as claimed in claim 1, wherein the cover of said transposition duct section is pivotally connected to said L-shaped body portion.

5. A duct run as claimed in claim 1, wherein the covers of said first and second connectors are pivotally connected respectively to the channel-shaped bodies thereof, the covers of said first and second duct sections are pivotally connected respectively to the channel-shaped bodies thereof, and the cover of said transposition duct section is pivotally connected to said L-shaped body portion.

6. A duct run as claimed in claim 1, wherein said side wall is provided with a flange removably secured to a leg of said L-shaped body portion forming the bottom of said two-part channel-shaped body of said transposition section.

7. A straight duct run of lay-in duct for electric current carrying wires, said duct run including two elongated spaced sections of lay-in duct extending in the same direction and having generally channel-shaped bodies rotated ninety degrees from each other about their longitudinal axes, a transposition duct section disposed between said sections of lay-in duct, and two connectors connecting opposite end portions of said transposition duct section respectively to said sections of lay-in duct, each of said connectors including a general channel-shaped body and a cover pivotally mounted on a side wall of the channel-shaped body and normally covering an open side thereof, said connectors being disposed in such a manner that the open sides of their generally channel-shaped bodies face respectively in the same directions as open sides of the generally channel-shaped bodies of the sections of lay-in duct connected respectively thereto face, said transposition duct section having a two-piece generally channel-shaped body disposed in such a manner that an open side thereof faces in the same direction as the open side of the generally channel-shaped body of one of said sections of lay-in duct faces, and a side piece of said two-piece generally channel-shaped body of said transposition duct section being removable, said side piece being disposed in a position corresponding to the position of the open side of the generally channel-shaped body of the other of said sections of lay-in duct.

References Cited

UNITED STATES PATENTS

| | | | |
|---|---|---|---|
| 2,917,083 | 12/1959 | Duvall et al. | 285—121 |
| 2,956,587 | 10/1960 | Fisher | 138—158 X |
| 3,023,032 | 2/1962 | Johnston et al. | 285—121 X |
| 3,161,722 | 12/1964 | Wellens et al. | 138—159 |

CARL W. TOMLIN, *Primary Examiner.*

R. G. BERKLEY, *Assistant Examiner.*